United States Patent
Lynar et al.

(10) Patent No.: US 9,042,386 B2
(45) Date of Patent: May 26, 2015

(54) DATA TRANSFER OPTIMIZATION THROUGH DESTINATION ANALYTICS AND DATA DE-DUPLICATION

(75) Inventors: Timothy M. Lynar, Carlton Vic (AU); Kent C. Steer, Carlton Vic (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 13/585,123

(22) Filed: Aug. 14, 2012

(65) Prior Publication Data
US 2014/0050222 A1    Feb. 20, 2014

(51) Int. Cl.
*H04L 12/28* (2006.01)
*G06F 17/30* (2006.01)
*H04L 29/08* (2006.01)

(52) U.S. Cl.
CPC ............ *G06F 17/3015* (2013.01); *H04L 67/10* (2013.01)

(58) Field of Classification Search
USPC .......... 370/394, 400, 392, 241, 252; 709/214; 713/153
See application file for complete search history.

(56) References Cited

U.S. PATENT DOCUMENTS

| | | | |
|---|---|---|---|
| 8,386,630 B1* | 2/2013 | Atzmon | 709/231 |
| 2003/0193901 A1* | 10/2003 | Ishibashi | 370/252 |
| 2004/0158706 A1* | 8/2004 | Moritomo et al. | 713/153 |
| 2007/0043824 A1* | 2/2007 | Fremantle | 709/214 |
| 2009/0077261 A1* | 3/2009 | Broadhurst | 709/246 |
| 2010/0265951 A1* | 10/2010 | Fujita et al. | 370/392 |

FOREIGN PATENT DOCUMENTS

WO    2012/034607    3/2012

* cited by examiner

*Primary Examiner* — Jung-Jen Liu
(74) *Attorney, Agent, or Firm* — Tutunjian & Bitetto, P.C.; Vazken Alexanian

(57) ABSTRACT

There are provided methods and systems for transferring requested data over a node chain from a source node to a destination node through at least two intermediate nodes. A method includes identifying, at a file system level, at each of the at least two intermediate nodes, prior data previously sent to or received from a subsequent node in the node chain that matches at least a portion of the requested data. The method also includes transmitting, to the subsequent node, at least one pointer to the prior data and a reconstruction recipe for reconstructing the requested data at the subsequent node based on at least the at least one pointer, when the prior data matches at least the portion of the requested data. The method further includes transmitting, to the subsequent node, other portions of the requested data previously unsent to or unreceived by the subsequent node.

25 Claims, 5 Drawing Sheets

DATA TRANSFER OPTIMIZATION THROUGH DESTINATION ANALYTICS AND DATA DE-DUPLICATION

BACKGROUND

1. Technical Field

The present principles relate generally to data transfer and, in particular, to data transfer optimization through destination analytics and data de-duplication.

2. Description of the Related Art

Transferring large quantities of data across slow or congested connections is a common challenge. This challenge will persist or even worsen if the growth in data transfer requirements exceeds the growth in bandwidth.

SUMMARY

According to an aspect of the present principles, there is provided a method for transferring requested data over a node chain from a source node to a destination node through at least two intermediate nodes. The method includes identifying, at a file system level, at each of the at least two intermediate nodes, prior data previously sent to or received from a subsequent node in the node chain that matches at least a portion of the requested data. The method also includes transmitting, to the subsequent node, at least one pointer to the prior data and a reconstruction recipe for reconstructing the requested data at the subsequent node based on at least the at least one pointer, when the prior data matches at least the portion of the requested data. The method further includes transmitting, to the subsequent node, other portions of the requested data previously unsent to or un-received by the subsequent node.

According to another aspect of the present principles, there is provided a system for transferring requested data over a node chain from a source node to a destination node through at least two intermediate nodes. The system includes a matching data portion identifier for identifying, at a file system level, at each of the at least two intermediate nodes, prior data previously sent to or received from a subsequent node in the node chain that matches at least a portion of the requested data. The system also includes a transmitting device for transmitting, to the subsequent node, at least one pointer to the prior data and a reconstruction recipe for reconstructing the requested data at the subsequent node based on at least the at least one pointer, when the prior data matches at least the portion of the requested data. The transmitting device also transmits, to the subsequent node, other portions of the requested data previously unsent to or un-received by the subsequent node.

According to yet another aspect of the present principles, there is provided a method for transferring requested data over a node chain from a source node to a destination node through at least two intermediate nodes. The method includes chunking a file at a plurality of chunking levels. The method also includes generating a respective reconstruction recipe for reconstructing the file at a subsequent node in the node chain and a respective chunk archive for storing chunks for the file, at each of the plurality of chunking levels. The method further includes selecting the respective reconstruction recipe and the chunk archive corresponding thereto resulting in a least amount of the data being transmitted to the subsequent node. The method additionally includes transmitting the selected reconstruction recipe and the selected chunk archive to the subsequent node.

According to still another aspect of the present principles, there is provided a system for transferring requested data over a node chain from a source node to a destination node through at least two intermediate nodes. The system includes a data chunker for chunking a file at a plurality of chunking levels. The system also includes a reconstruction recipe and chunk archive generator for generating a respective reconstruction recipe for reconstructing the file at a subsequent node in the node chain and a respective chunk archive for storing chunks for the file, at each of the plurality of chunking levels. The reconstruction recipe and chunk archive generator also selects the respective reconstruction recipe and the chunk archive corresponding thereto resulting in a least amount of the data being transmitted to the subsequent node. The system further includes a transmitting device for transmitting the selected reconstruction recipe and the selected chunk archive to the subsequent node.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to data transfer optimization through destination analytics and data de-duplication. The present principles reduce data re-transmission by strategically maintaining data warehouses at intermediate nodes. When a user wishes to transfer data between two nodes, we check to see if some or all of that data already exists at a node closer to the recipient. In an embodiment, we then only send the following: (1) the data not existing on suitable intermediate nodes; and (2) the instructions required to assemble the original data. Such a policy will increase transfer speeds and reduce transmission costs. It should be noted that the preferred embodiment obviates the need to synchronize databases between nodes.

In an embodiment, the present principles use a chained de-duplication strategy that incorporates dynamic chunking optimization to reduce the size of data transmission. As used herein, the term "chained de-duplication strategy" refers to the disclosed de-duplication strategy that incorporates file level de-duplication on multiple hosts. Moreover, as used herein, the term "dynamic chunking optimization" refers to the method disclosed for selecting the optimal size of file sections or "chunks" that are then compared against one another.

Figure 1:
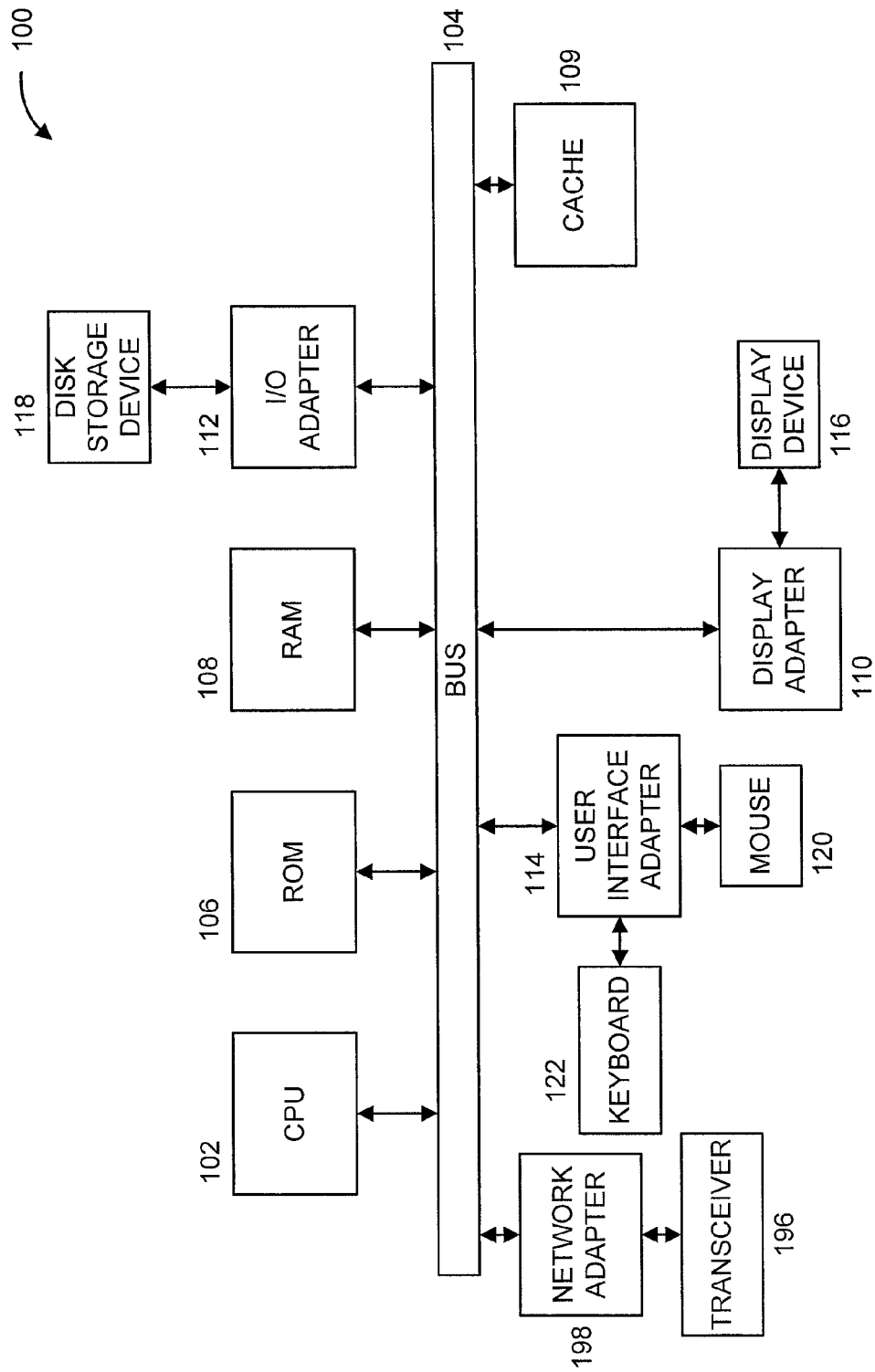
FIG. 1 shows an exemplary processing system 200 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. Additionally, elements of processing system 100 such as the keyboard 122 and mouse 120 may be omitted with a user interfacing with the processing system 100 via the transceiver 196 and/or some other element (shown or not shown) in FIG. 1. These and other variations of processing system 100 and the elements included therein are readily contemplated by one of ordinary skill in the art, while maintaining the spirit of the present principles.

Figure 2:
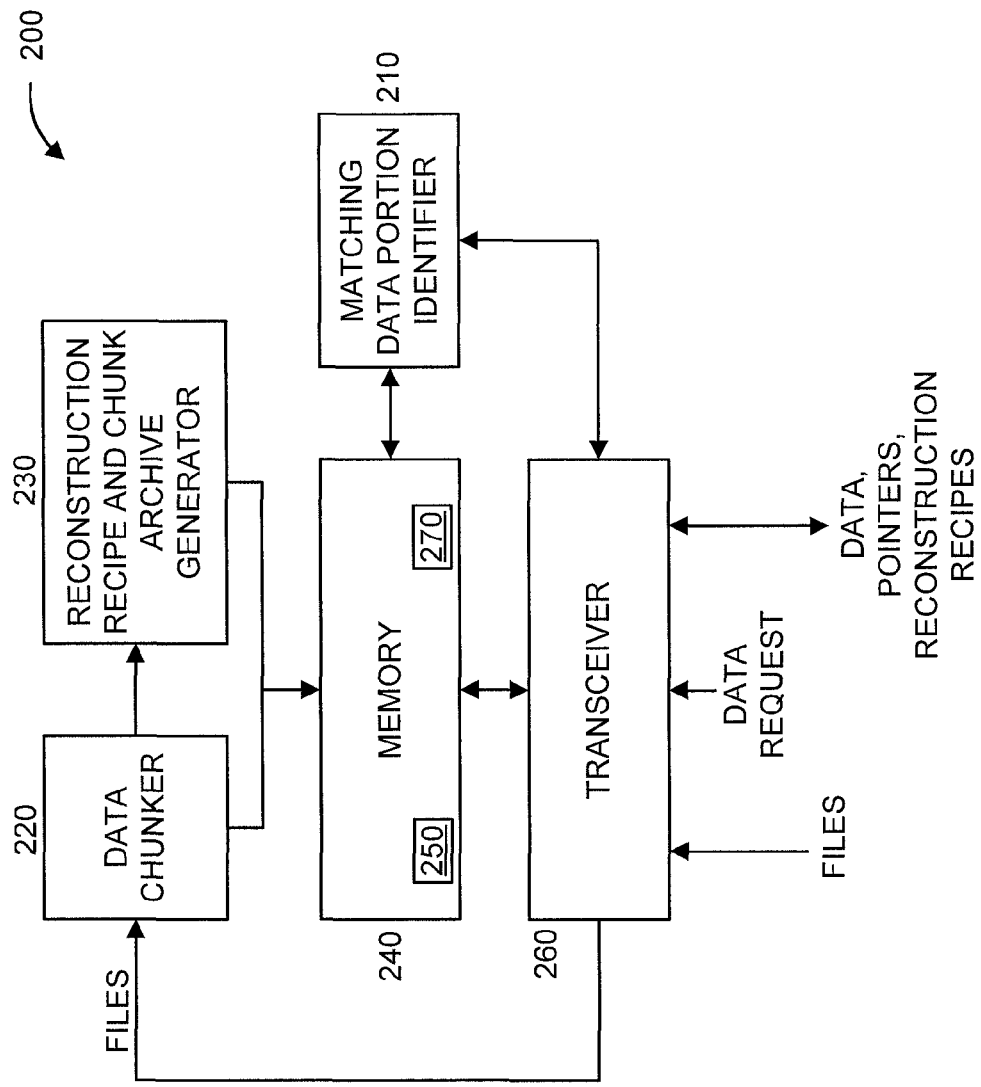
FIG. 2 shows an exemplary system 200 for data transfer optimization through destination analytics and data de-duplication, in accordance with an embodiment of the present principles.

Moreover, it is to be appreciated that system 200 described below with respect to FIG. 2 is essentially a system for implementing a respective embodiment of the present principles. Part or all of processing system 100 may be implemented in one or more of the elements of system 200.

Figure 3:
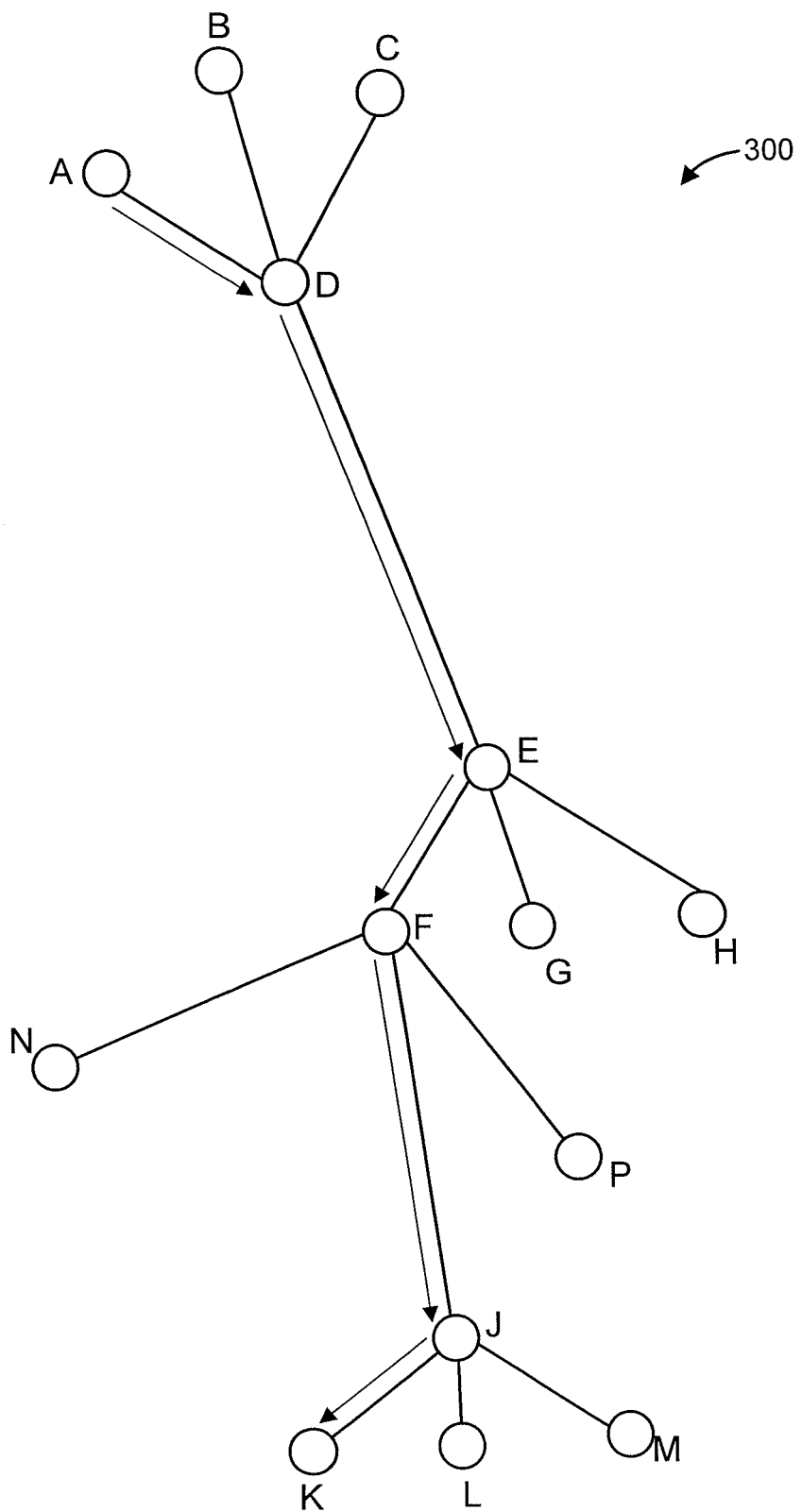
FIG. 3 shows an exemplary network 300 of nodes to which the present principles can be applied, in accordance with an embodiment of the present principles.

Similarly, network 300 described below with respect to FIG. 3 is essentially a network to which the present principles can be applied, in accordance with an embodiment of the present principles. Part or all of processing system 100 may be implemented in one or more of the elements of network 300.

Figure 4:
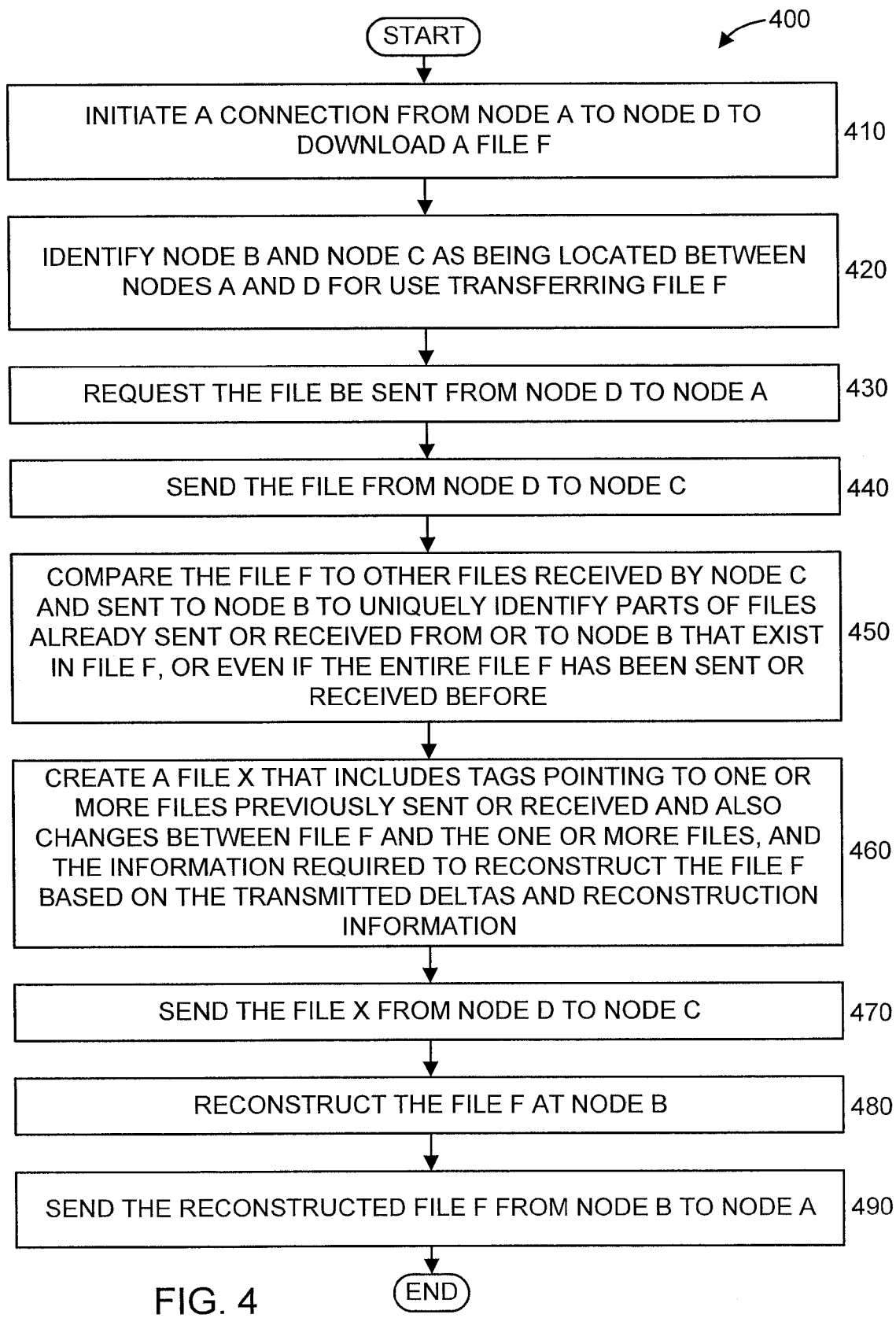
FIG. 4 shows an exemplary method 400 for data transfer optimization through destination analytics and data de-duplication, in accordance with an embodiment of the present principles.

Further, it is to be appreciated that processing system 100 may perform at least part of the methods described herein including, for example, parts of method 400 of FIG. 4.

FIG. 2 shows an exemplary system 200 for data transfer optimization through destination analytics and data de-duplication, in accordance with an embodiment of the present principles. The system 200 can be located on one or more involved nodes in a data transfer. The system 200 includes a matching data portion identifier 210, a data chunker 220, a reconstruction recipe and chunk archive generator 230, a database 240, an index 250, and a transceiver 260. The database 240 may include the index 250 as well as a chunk archive 270.

The matching data portion identifier 210 compares requested data to pre-stored data to determine whether any portions of the requested data match the pre-stored data.

The data chunker 220 inputs a received file and chunks the received file. In an embodiment, the received file is chunked at a plurality of chunking levels.

The reconstruction recipe and chunk archive generator 230 generates a reconstruction recipe for reconstructing at least some of the requested data (e.g., at a subsequent node including, e.g., a next-non-destination node or a destination node).

In an embodiment, the reconstruction recipe and chunk archive generator 230 generates a set of reconstruction recipes and a set of chunk archives, and selects for use the reconstruction recipe and the chunk archive corresponding thereto that result in the least amount of data being transmitted (e.g., overall, for a given transfer, or over a portion of a link, etc.). While shown as a single element, in other embodiments the reconstruction recipe and chunk archive generator 230 can be implemented as more than one element. For example, the functionality for generating reconstruction recipes can be implemented in one element, while the functionality for generating the chunk archives can be implemented in another element.

The database 240 stores data therein. In an embodiment, the data stored in the database 240 is selectively chosen for such storage. In an embodiment, the data stored in the database 240 is stored therein for a predetermined period of time.

The index 250 identifies the data stored in the database 240 at the same node. In an embodiment, the index 250 also identifies the data stored in the database at other nodes. In an embodiment, the index 250 itself may also be stored in the database 240.

The transceiver 260 initially receives the file that is provided to the data chunker 220 for chunking. Moreover, the transceiver 260 transmits data, pointers, and reconstruction recipes to one or more other (e.g., downstream) nodes. For example, in an embodiment, the transceiver 260 transmits one or more portions of requested data (e.g., stored there at or forwarded from a previous node), one or more pointers to data (e.g., one or more portions of the requested data) that is already stored (e.g., there at (same node) or at a different node) along with one or more reconstruction recipes for reconstructing the data at a subsequent node. The subsequent node can be a next-non-destination node, or can be the destination node. It is to be appreciated that a given transceiver 260 at a given node may also receive one or more portions of requested data, one or more pointers to data, and one or more reconstruction recipes for reconstructing the data at a subsequent node, since the given node may be one of at least two intermediate nodes and the data, pointers, and recipes from a preceding node may be forwarded along to the given node.

The functions performed by the elements of system 200 will be described in further detail herein below.

FIG. 3 shows an exemplary network 300 of nodes to which the present principles can be applied, in accordance with an embodiment of the present principles. Network 100 includes leaf nodes A-H, J-N, and P.

Suppose we wish to transfer data from leaf node A to leaf node D. In a traditional network architecture, this data would travel through nodes B and C before reaching the destination. However, in many cases the data being transferred, or portions of it, will have been previously transferred through some of the intermediate nodes.

In an embodiment of the present principles, at each warehouse node, we store some or all data passing through that warehouse node and maintain a catalogue of some or all of the data stored at some or all other warehouse nodes. Each proceeding node knows what data it has sent to each subsequent node, and by way of an agreed strategy knows what data each subsequent node has stored.

For example, if we again consider the network in FIG. 3, when node A transmits data to node D, nodes B and C will record some or all of that data as it passes through them. The next time a leaf node behind node B sends data to a leaf node behind node C (e.g., in the case of node A sending data to node D), node B first compares the data in the new transmission to its records of data previously transmitted to node C. If part or all of that data has previously been transmitted we need only send instructions on how to retrieve that data from the data warehouse at node C. By doing so, we reduce the load on the link between node B and node C.

A description will now be provided of a preferred embodiment of the present principles with respect to FIG. 4. The following steps are performed to send a file from node A to node D, when nodes B and C are at either end of a slow link and are between nodes A and D. It should be noted that in this embodiment node A sends all traffic to node D through node B and node C in that order.

FIG. 4 shows an exemplary method for data transfer optimization through destination analytics and data de-duplication, in accordance with an embodiment of the present principles.

At step 410, a connection is initiated from node A to node D to download a file f.

At step 420, node B and node C are identified as being located between node A and node D for use in transferring file f.

At step 430, node A requests that the file f be sent from node D.

At step 440, node D sends the file f to node C.

At step 450, node C compares the file f to other files it has received and sent to node B to uniquely identify parts of files already sent to or received from node B that exist in file f, or even if the entire file f has been sent (to node B) or received (by node B) before.

At step 460, node C creates a file x that includes tags pointing to one or more files previously sent or received and also includes changes between the file f and the one or more files (previously sent or received), and the information required to reconstruct the file f based on the transmitted changes and reconstruction information. In an embodiment, the changes are determined by performing a bit-by-bit comparison of received files to files previously sent or received. In an embodiment, the changes are sent when an amount of the prior data above a threshold amount matches at least the portion of the requested data. In this way, a significantly reduced amount of data is transmitted as compared to transmitting all of the data.

At step 470, node C transfers file x to node B.

At step 480, node B reconstructs the file f.

At step 490, node B sends the reconstructed file f to node A.

Figure 5:
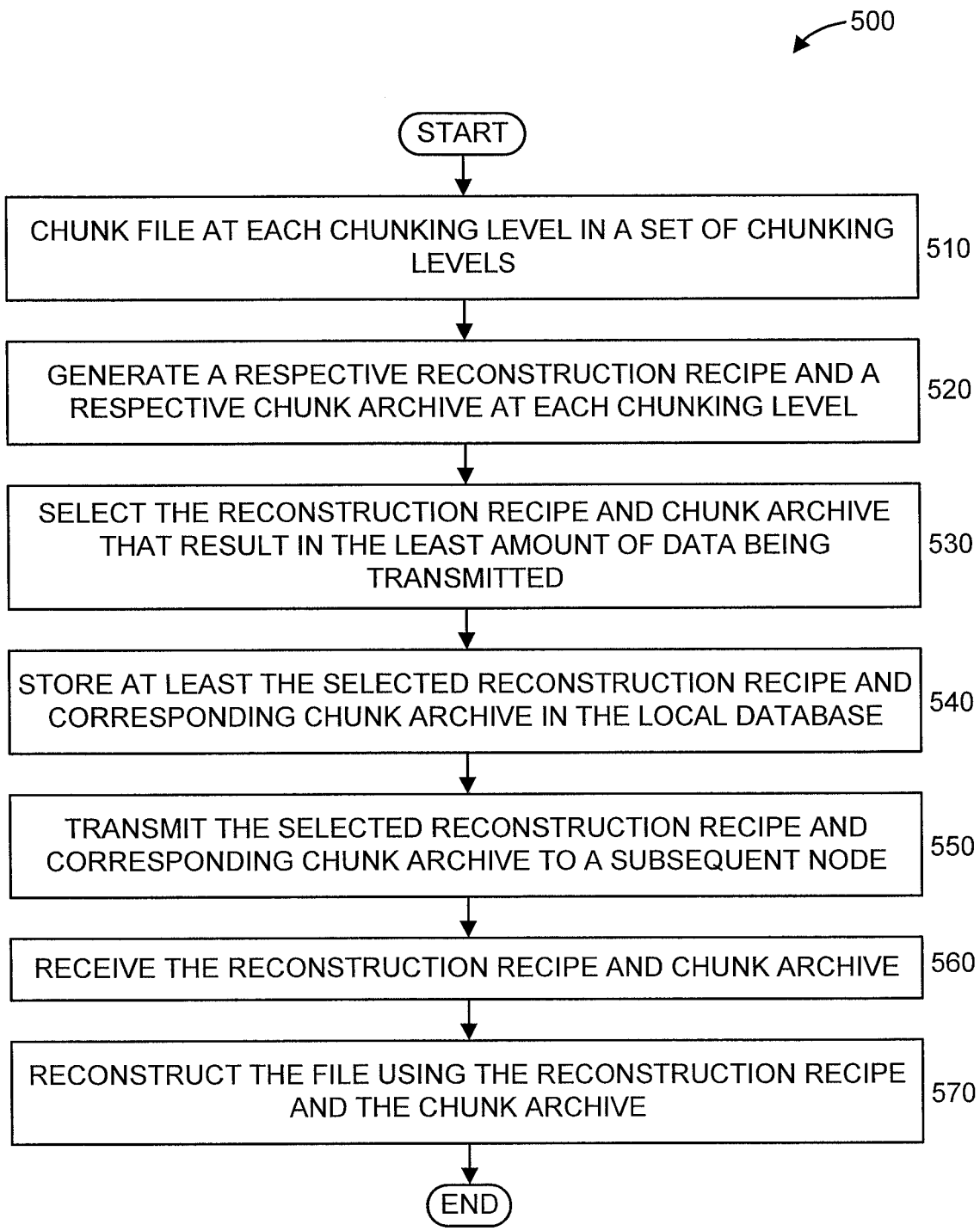
FIG. 5 shows another exemplary method 500 for data transfer optimization through destination analytics and data de-duplication, in accordance with an embodiment of the present principles.

A description will now be provided of an alternate embodiment of the present principles with respect to FIG. 5. The alternate embodiment describes a system that operates our de-duplication system between all nodes, not just the nodes at either side of a slow connection, that is, all nodes store large databases of all sent and received files (based on agreed rules).

FIG. 5 shows another exemplary method for data transfer optimization through destination analytics and data de-duplication, in accordance with an embodiment of the present principles.

At step 510, a received file is chunked (at all possible viable chunking levels (administratively set) by data chunker 220.

At step 520, a reconstruction recipe and chunk archive are generated at each chunking level by the reconstruction recipe and chunk archive generator 230 through file system level de-duplication utilizing the file system to de-duplicate against the known files on the next smart node in the chain. A reconstruction recipe is for reconstructing the file at a subsequent node, given a particular chunking level in the set and hence, given a particular chunk archive. A chunk archive is for storing the chunks (e.g., for a predetermined period of time) at a given chunking level. Thus, each reconstruction recipe corresponds to a particular chunk archive, with both that reconstruction recipe and chunk archive corresponding to the same chunking level.

At step 530, the optimal reconstruction recipe and chunk archive that would result in the least amount of data being transmitted are selected by the reconstruction recipe and chunk archive generator 230.

At step 540, at least the selected reconstruction recipe and the chunk archive corresponding thereto are stored (e.g., in local database 240).

At step 550, the optimal reconstruction recipe and chunk archive are transmitted on to the next smart node in the chain by the transceiver 260.

At step 560, the next smart node in the chain receives the reconstruction recipe and chunk archive via the transceiver 260.

At step 570, the next smart node in the chain reconstructs the file using the received reconstruction recipe and chunk archive.

Steps 510 through 570 are repeated for each smart node in the chain.

We will now describe an illustrative embodiment of the present principles. To that end, we will presume the following. Leaf node D stores in it everything that it has sent to leaf node E (for an agreed period) and so on. Thus, in an embodiment, each smart node keeps a record of the files sent to it from each preceding smart node for an agreed period of time. Let us presume that the primary level of de-duplication is at the file system level. Let us presume that the file is a file of a substantial size. Let us presume that the path to K can be determined from A through either a common configuration or some other pre-determined understanding of network topology (common or otherwise).

Referring again to FIG. 3, if leaf node A wanted to send a file to leaf node K, leaf node A would send a file to leaf node D which would send a file to leaf node E which would send a file to leaf node F which would send a file to leaf node J which would send a file to leaf node K.

At each smart node (D, E, F, J), the following would occur.

On receipt of the entire file. Each sending smart node would perform steps 510 through 570 described above with respect to FIG. 5.

A description will now be given of an alternate embodiment. Given that the smart node stores data transferred through it, the smart node knows if a child node (in this example node G) has a file that includes chunks of data that would be useful in the reconstruction of the original file. If it is found to include chunks useful for the reconstruction of the file and there is an alternate path between node G and the destination node (node F) and that there is a perceived benefit in using that alternative path, then chunks stored on node G could be used to aid the transfer of a chunk archive to the destination node. In such a case, node G could be used to aid the transfer by way of the creation of a partial chunk archive on node G that is then transferred to the next smart node in the chain along with the chunk archive from the preceding smart node, node E.

A description will now be given regarding other considerations pertinent to the present principles. Data sent to nodes may expire after a given known time. The same level of trust applies to sending data through routers. De-duplication also works on encrypted data. The data on a node, about a node it sends to, has to be up-to-date and in-synchronization. Communication through these nodes may occur using custom software, such as custom file transfer software. Although an embodiment of the present principles has been described as functioning at either end of a link, it is possible for the present principles to operate between any two connected nodes. It is possible for the system to operate between joining nodes, i.e., between A and B and between B and C and between C and D.

A description will now be given regarding how the present principles differ from wide area network (WAN) optimization. This is top down rather than bottom up. In contrast to WAN optimization, the present principles do not need to know what the files are that are being received. In contrast to WAN optimization where data de-duplication occurs at the file level, the present principles perform data reduplication occurs at the file system level. For de-duplication to occur, the file that is being currently sent never has to have been sent before. This is therefore vastly different to current WAN Caching strategies that rely on known files to be re-sent.

Additionally, regarding how the present principles differ from wide area network (WAN) optimization, we note the following. WAN optimization incorporates caching and de-duplication. De-duplication in WAN optimization operates at Layer-4 of the Open Systems Interconnection stack. Wan de-duplication operates by storing dictionaries of file patterns that have been identified based on prior transmission. These dictionaries must be kept small to not impede the timely transmission of files. In contrast, the present principles use de-duplication at the file system level (byte level). The present principles use a chained de-duplication strategy that incorporates dynamic chunking optimization to reduce the size of transmission. This is a chained strategy and thus a transfer between two nodes that incorporates more than one intermediary node will result in the optimization process being utilized more than once. The present principles allow for de-duplication "dictionaries" larger than would be possible with an appliance that must transfer a file live. The present principles allow for a far greater opportunity to reduce bandwidth usage.

We further note the following. The present principles do not require any centralized knowledge of who has what. Nor does it rely on the destination node being able to obtain knowledge of who has what.

Our system relies on file system level de-duplication. We note the following regarding file system level de-duplication. The present principles utilize file system level de-duplication where "file systems" include the known files on the receiving node. These files are known because the sending node has stored these files for an agreed time. This may also be referred to as bite level de-duplication.

A description will now be given of the benefits provided by the present principles over prior art geographical optimization strategies. There are a number of current strategies for link optimization. Some of these include de-duplication based strategies. Some de-duplication based strategies attempt to de-duplicate live streams of data between two nodes with prior knowledge of parts of files sent to that node before. In these strategies an attempt is made to recognize on-the-fly and de-duplicate. On-the-fly data de-duplication involves the estimation of incoming data or the chunking and hashing of incoming data on-the-fly against a known synced database.

Other strategies involve the syncing of file systems. The present principles do not require the receiving node or the sending node to have any prior knowledge of one another, nor does it require an intimate knowledge of the files stored on other leaf nodes. The present principles are not implemented on-line and thus subject to delayed transmission; accordingly, the present principles can leverage substantial time to optimally de-duplicate prior to sending. The present principles do not involving the syncing of large databases. The present principles can leverage several nodes between the sending node and the receiving node.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transferring requested data over a node chain from a source node to a destination node through at least two intermediate nodes, comprising:
    identifying, at a file system level, at each of the at least two intermediate nodes, prior data previously sent to or received from a subsequent node in the node chain that matches at least a portion of the requested data;
    transmitting, to the subsequent node, at least one pointer to the prior data and a reconstruction recipe for reconstructing the requested data at the subsequent node based on at least the at least one pointer, when the prior data matches at least the portion of the requested data; and
    transmitting, to the subsequent node, other portions of the requested data previously unsent to or un-received by the subsequent node.

2. The method of claim 1, wherein said identifying step identifies, at a non-transport layer, the prior data that matches at least the portion of the requested data.

3. The method of claim 1, wherein the file system level is at a byte level.

4. The method of claim 1, wherein the data transfer method further comprises, by at least each of the at least two destination nodes:
    chunking a file at a plurality of chunking levels;
    generating a respective reconstruction recipe for reconstructing the file at the subsequent node and a respective chunk archive for storing chunks for the file, at each of the plurality of chunking levels; and
    transmitting the reconstruction recipe and the chunk archive corresponding to at least one of the plurality of chunking levels to the subsequent node,
    wherein the file is comprised in the prior data that is used by said identifying step.

5. The method of claim 4, wherein said generating step comprises:
    generating a plurality of reconstruction recipes and a plurality of chunk archives; and
    selecting a given one of the plurality of reconstruction recipes and a given one of the plurality of chunk archives corresponding thereto that result in a least amount of the data being transmitted over the node chain.

6. The method of claim 4, wherein the subsequent node is a next-non-destination node in the node chain.

7. The method of claim 4, wherein the subsequent node is the destination node.

8. The method of claim 1, wherein said identifying and transmitting steps are limited to being performed by only one of the at least two intermediate nodes at each side of a slow connection, the slow connection having a data transfer rate less than a predetermined threshold.

9. The method of claim 1, further comprising maintaining a respective index and a respective database at each of the at least two intermediate nodes, the respective index identifying data stored in the respective database at a same one of the at least two intermediate nodes.

10. The method of claim 9, wherein the respective index maintained at each of the at least two intermediate nodes further identifies data stored in the respective database at other ones of the at least two intermediate nodes.

11. The method of claim 10, wherein the respective index maintained at each of the at least two intermediate nodes further identifies data stored at the source node and the destination node.

12. The method of claim 9, wherein the respective database at each of the at least two intermediate nodes is unsynchronized to the respective database at other ones of the least two intermediate nodes.

13. The method of claim 1, wherein the requested data is completely reconstructed at one of the at least two intermediate nodes, and the completely reconstructed requested data is then transmitted to a subsequent node.

14. The method of claim 1, further comprising transmitting, to the subsequent node, changes between the prior data and the requested data, when an amount of the prior data above a threshold amount matches at least the portion of the requested data.

15. The method of claim 1, wherein the method is implemented in a computer-executable program tangibly embodied on a computer readable storage medium.

16. A system for transferring requested data over a node chain from a source node to a destination node through at least two intermediate nodes, comprising:
a matching data portion identifier for identifying, at a file system level, at each of the at least two intermediate nodes, prior data previously sent to or received from a subsequent node in the node chain that matches at least a portion of the requested data; and
a transmitting device for transmitting, to the subsequent node, at least one pointer to the prior data and a reconstruction recipe for reconstructing the requested data at the subsequent node based on at least the at least one pointer, when the prior data matches at least the portion of the requested data, and for transmitting, to the subsequent node, other portions of the requested data previously unsent to or un-received by the subsequent node.

17. The system of claim 16, wherein said matching data portion identifier identifies, at a non-transport layer, the previously stored data that matches at least the portion of the requested data.

18. The system of claim 16, wherein the requested data is completely reconstructed at one of the at least two intermediate nodes, and the completely reconstructed requested data is then transmitted to a subsequent node.

19. The system of claim 16, wherein said transmitting device further transmits, to the subsequent node, changes between the prior data and the requested data, when an amount of the prior data above a threshold amount matches at least the portion of the requested data.

20. A method for transferring requested data over a node chain from a source node to a destination node through at least two intermediate nodes, comprising:
chunking a file at a plurality of chunking levels;
generating a respective reconstruction recipe for reconstructing the file at a subsequent node in the node chain and a respective chunk archive for storing chunks for the file, at each of the plurality of chunking levels;
selecting the respective reconstruction recipe and the chunk archive corresponding thereto resulting in a least amount of the data being transmitted to the subsequent node; and
transmitting the selected reconstruction recipe and the selected chunk archive to the subsequent node.

21. The method of claim 20, wherein the file is completely reconstructed at one of the at least two intermediate nodes, and the completely reconstructed file is then transmitted to a subsequent non-destination node in the node chain.

22. The method of claim 20, wherein the file is completely reconstructed at one of the at least two intermediate nodes, and the completely reconstructed file is then transmitted to the destination node.

23. A system for transferring requested data over a node chain from a source node to a destination node through at least two intermediate nodes, comprising:
a data chunker for chunking a file at a plurality of chunking levels;
a reconstruction recipe and chunk archive generator for generating a respective reconstruction recipe for reconstructing the file at a subsequent node in the node chain and a respective chunk archive for storing chunks for the file, at each of the plurality of chunking levels, and for selecting the respective reconstruction recipe and the chunk archive corresponding thereto resulting in a least amount of the data being transmitted to the subsequent node; and
a transmitting device for transmitting the selected reconstruction recipe and the selected chunk archive to the subsequent node.

24. The system of claim 23, wherein the file is completely reconstructed at one of the at least two intermediate nodes, and the completely reconstructed file is then transmitted to a subsequent non-destination node in the node chain.

25. The system of claim 23, wherein the file is completely reconstructed at one of the at least two intermediate nodes, and the completely reconstructed file is then transmitted to the destination node.

* * * * *